(12) United States Patent
Chen et al.

(10) Patent No.: US 8,914,853 B2
(45) Date of Patent: Dec. 16, 2014

(54) BLOCKING NETWORK ACCESS FOR UNAUTHORIZED MOBILE DEVICES

(71) Applicant: Verizon Patent and Licensing Inc., Basking Ridge, NJ (US)

(72) Inventors: Xuming Chen, San Ramon, CA (US); Mingxing S. Li, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 33 days.

(21) Appl. No.: 13/707,817

(22) Filed: Dec. 7, 2012

(65) Prior Publication Data

US 2014/0165149 A1   Jun. 12, 2014

(51) Int. Cl.
*H04L 29/06* (2006.01)
*H04W 12/06* (2009.01)

(52) U.S. Cl.
CPC .............. *H04L 63/10* (2013.01); *H04W 12/06* (2013.01); *H04L 63/101* (2013.01)
USPC ................. 726/4; 713/168; 455/410

(58) Field of Classification Search
CPC .... H04L 63/101; H04L 63/0853; H04L 12/06
USPC .......................................................... 726/4
See application file for complete search history.

(56) References Cited

U.S. PATENT DOCUMENTS

| 7,567,795 B1* | 7/2009 | Champion et al. ............ 455/410 |
| 8,010,083 B2* | 8/2011 | Descombes et al. ......... 455/410 |
| 8,565,764 B2* | 10/2013 | Pudney et al. ............. 455/435.1 |
| 2003/0096605 A1* | 5/2003 | Schlieben et al. ............ 455/419 |
| 2006/0009214 A1* | 1/2006 | Cardina et al. ............. 455/432.3 |
| 2007/0032232 A1* | 2/2007 | Bleckert et al. ............... 455/433 |
| 2007/0050622 A1* | 3/2007 | Rager et al. .................... 713/168 |
| 2007/0173229 A1* | 7/2007 | Dong et al. .................... 455/411 |
| 2008/0216158 A1* | 9/2008 | Imbimbo et al. ................ 726/4 |
| 2009/0061854 A1* | 3/2009 | Gillot et al. ............... 455/432.1 |
| 2009/0129371 A1* | 5/2009 | Bishay .......................... 370/352 |
| 2009/0280777 A1* | 11/2009 | Doherty ........................ 455/411 |
| 2009/0305699 A1* | 12/2009 | Deshpande et al. .......... 455/434 |
| 2011/0116382 A1* | 5/2011 | McCann et al. ............. 370/241 |
| 2012/0094633 A1* | 4/2012 | Parsons et al. ................ 455/411 |
| 2012/0196570 A1* | 8/2012 | Lindholm et al. ............ 455/411 |

* cited by examiner

*Primary Examiner* — Hadi Armouche
*Assistant Examiner* — Bryan Wright

(57) ABSTRACT

A first server, associated with a first network, may: receive a first query from a network device associated with a second network; determine an identifier associated with the user device; provide, to a second server, a second query including the identifier; receive, from the second server, a response to the second query, the response identifying whether the identifier of the user device is being stored by the second server; and provide to the network device, a response to the first query, the response to first query identifying whether the user device is authorized to access the second network based on determining that the user device is not authorized to access the second network when the identifier is being stored by the second server or based on determining that the user device is authorized to access the second network when the identifier is not being stored by the second server.

20 Claims, 5 Drawing Sheets

BLOCKING NETWORK ACCESS FOR UNAUTHORIZED MOBILE DEVICES

BACKGROUND

A user device sometimes includes a subscriber identity module (SIM) card linked to a user account associated with the user device. The SIM card may include information to authorize a user device to access a network, such as a home cellular network or a roaming cellular network, via the user device. The SIM card may be interchangeable with multiple user devices so that one user account may be used to access the network using the SIM card. For example, a user may remove the SIM card from a user device, and install the SIM card in another user device to access the network using the other user device and the SIM card. While removing a SIM card from one device to another device may permit a level of convenience when a user replaces a user device, stolen or unauthorized user devices may be used to access the network when a user installs a SIM card in the stolen or unauthorized user device.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may permit a network device, associated with a roaming network, to identify whether a user device is permitted to access the roaming network based on information stored by an equipment information register (EIR) server associated with a home network (e.g., a server that maintains a blacklist representing a list of stolen or unauthorized user devices).

Figure 1:
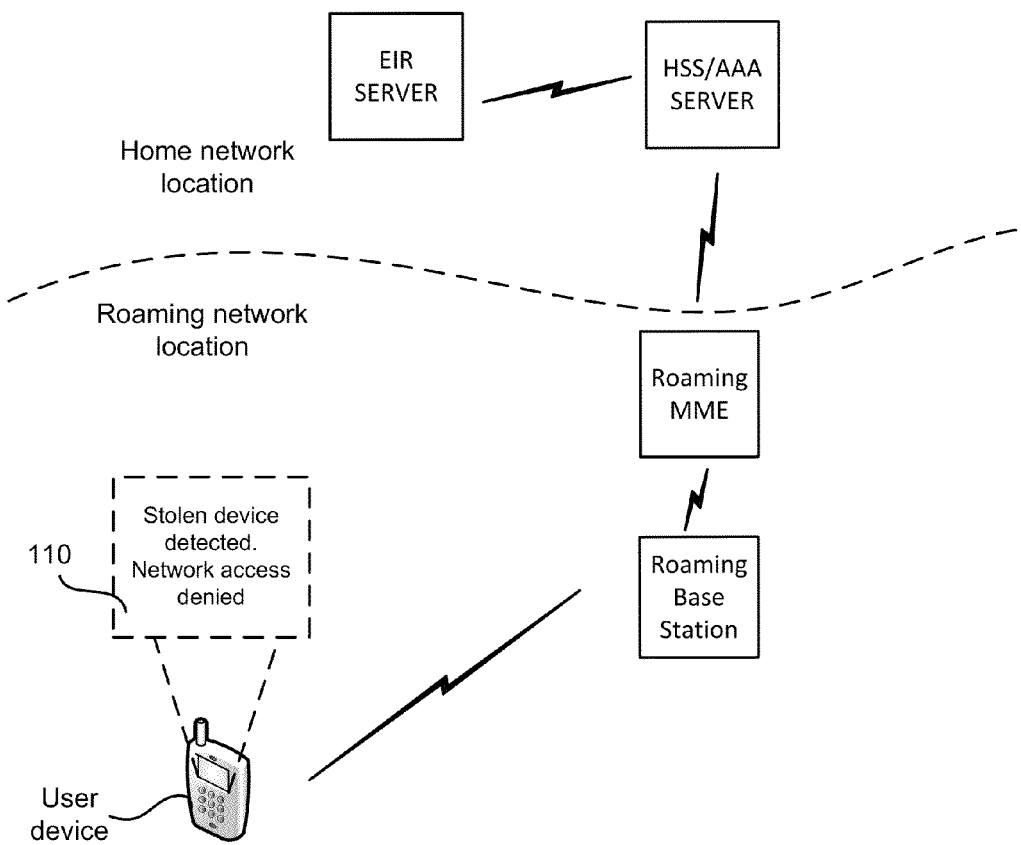
FIG. 1 illustrates an example overview of an implementation described herein.

FIG. 1 illustrates an example overview of an implementation described herein. In FIG. 1, assume that a user device is associated with a home network that services a particular geographic region. Further, assume that the user device is stolen or is otherwise considered to be an unauthorized user device and that an identifier regarding the user device is stored by an EIR server. As shown in FIG. 1, the user device may attempt to connect to a roaming network (e.g., via a roaming base station), associated with a different geographic region than the geographic region of the home network, when the user device is located in the geographic region of the roaming network.

In some implementations, a network device in the roaming network device (e.g., a roaming mobility management entity device (MME)) may communicate with a home subscriber server (HSS)/authentication, authorization, and accounting (AAA) server, associated with the home network, to determine whether the user device is authorized to access the roaming network. For example, the roaming MME may provide, to the HSS/AAA server, information stored by a SIM card, associated with the user device, and may provide an identifier, associated with the user device, as part of an authorization query to the HSS/AAA server to determine whether the user device is authorized to access the roaming network. In some implementations, the roaming MME may identify the HSS/AAA server associated with the user device based on information stored by a SIM card associated with the user device (e.g., a network carrier code, or some other information that may be used to identify the HSS/AAA server).

The HSS/AAA server may determine whether the user device is authorized to access the roaming network based on information stored by the SIM card, based on information stored by the HSS/AAA server, and based on information stored by the EIR server. For example, HSS/AAA server may store information to identify that the SIM card is associated with a user account that permits usage of the roaming network (e.g., at a billing rate that may differ from a billing rate associated with usage of the home network).

In some implementations, the HSS/AAA server may provide the identifier of the user device to the EIR server to identify whether the EIR server includes the identifier of the user device in a blacklist stored by the EIR server. For example, the HSS/AAA server may automatically query the EIR server based on receiving an authorization query from a roaming network device. In some implementations, the communication interface between the HSS/AAA server and the EIR server may be based on an S13 interface or some other type of interface.

In FIG. 1, assume the identifier of the user device is stored by the EIR, meaning that the user device is included on a blacklist of stolen or unauthorized user devices. Given this assumption, the EIR may provide an indication to the HSS/AAA server that the identifier of the user device is stored by the EIR. In some implementations, the HSS/AAA server may provide an indication to the roaming MME that the user device is not authorized to access the roaming network and the MME provide an indication, to the user device, that the user device may not access the roaming network. As shown in interface 110, the user device may display an indication that access to the roaming network has been denied.

As a result, the roaming MME may receive an indication as to whether the user device is authorized to access the roaming network without the MME needing to communicate with the EIR server associated with the home network.

While the systems and/or methods are described in terms of preventing an unauthorized device from accessing a roaming network, the systems and/or methods are not so limited. For example, the systems and/or methods may apply in an implementation to prevent an authorized device from accessing a home network, via communication between the HSS/AAA server and the EIR server.

Figure 2:
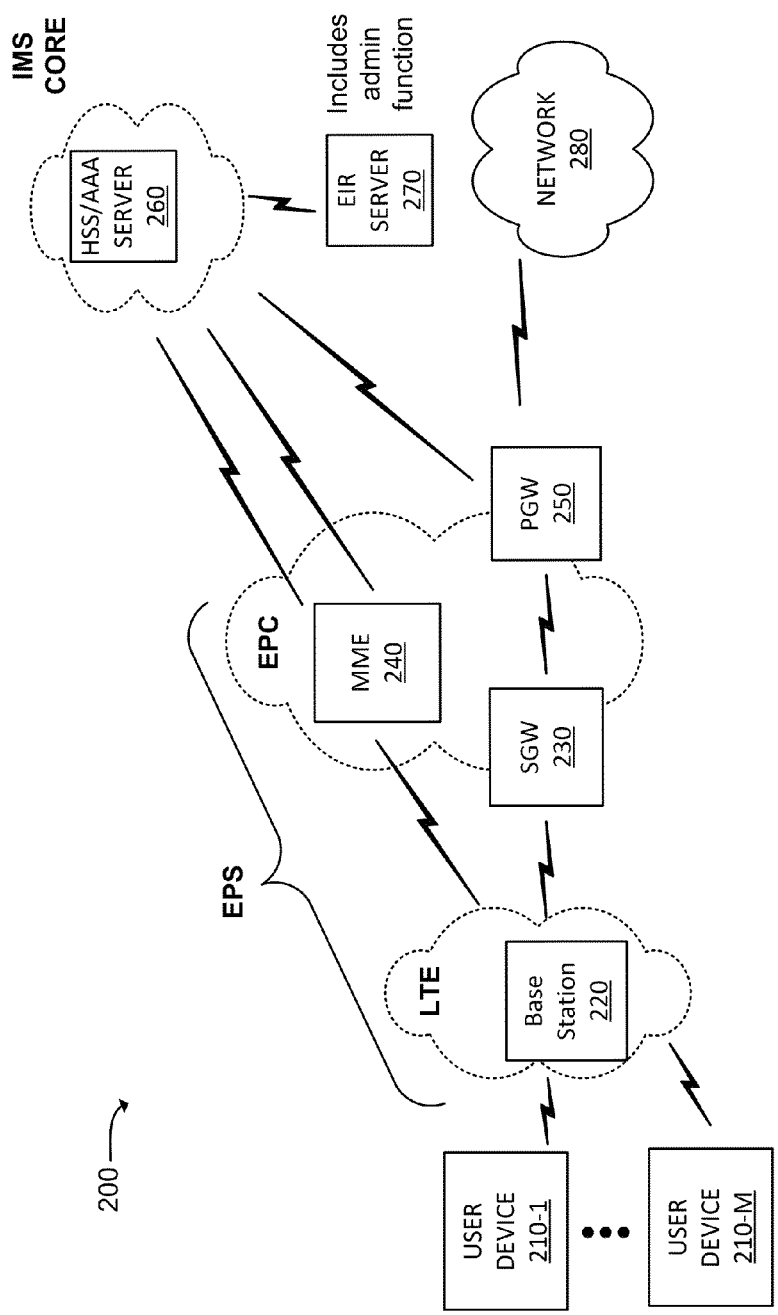
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210, ..., 210-M (where M≥1), a base station 220, a serving gateway 230 (referred to as "SGW 230"), an MME 240, a packet data network (PDN) a gateway (PGW) 250, an HSS/AAA server 260, an EIR server 270, and a network 280. In some implementations, a home network or a roaming network may include some or all of the devices in environment 200. For example, a home network may include a first set of devices (e.g., a home base station 220, a home SGW 230, a home MME 240, a home PGW 250, a home HSS/AAA server 260, and a home EIR server 270), and a roaming network may include a second set of devices (e.g., a roaming base station 220, a roaming SGW 230, a roaming MME 240, a roaming PGW 250, a roaming HSS/AAA server 260, and a roaming EIR server 270).

Environment 200 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations, such as eNodeBs (eNBs), via which user device 210 communicates with the EPC. The EPC may include SGW 230, MME 240, 250, and/or PCRF 260 that enables user device 210 to communicate with network 280 and/or an Internet protocol (IP) multimedia subsystem (IMS) core. The IMS core may include HSS/AAA server 260 and may manage authentication, connection initiation, account information, a user profile, etc. associated with user device 210. As shown in FIG. 2, the LTE network may include base station 220, and the EPC may include SGW 230, MME 240, and/or PGW 250.

User device 210 may include a portable computation or communication device, such as a wireless mobile communication device that is capable of communicating with base station 220 and/or a network (e.g., network 280). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of computation or communication device. User device 210 may send data to and/or receive data from network 280.

In some implementations, user device 210 may relate to a client device, such as a desktop computer, a laptop computer, or some other type of computing device that may provide identifiers associated with stolen or unauthorized user devices 210 to EIR server 270.

In some implementations, user device 210 may include client software to provide an instruction to EIR server 270 to add an identifier of user device 210 to a blacklist data structure stored by EIR server 270. For example, user device 210 may provide the instruction when user device 210 relocates to a particular geographic region or exits a particular geographic region (e.g., to allow user device 210 to report itself as stolen when user device 210 relocates to a particular geographic region or exits a particular geographic region that a user of user device 210 may not be associated with).

Base station 220 may include one or more network devices that receive, process, and/or transmit traffic, such as audio, video, text, and/or other data, destined for and/or received from user device 210. In an example implementation, base station 220 may be an eNB device and may be part of the LTE network. Base station 220 may receive traffic from and/or send traffic to network 280 via SGW 230 and PGW 250. Base station 220 may send traffic to and/or receive traffic from user device 210 via an air interface. One or more of base stations 220 may be associated with a RAN, such as the LTE network.

SGW 230 may include one or more network devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more base stations 220 and may send the aggregated traffic to network 280 via PGW 250. In one example implementation, SGW 230 may route and forward user data packets, may act as a mobility anchor for a user plane during inter-eNB handovers, and may act as an anchor for mobility between LTE and other 3GPP technologies.

MME 240 may include one or more network devices that perform operations associated with a handoff to and/or from the EPS. MME 240 may perform operations to register user device 210 with the EPS, to handoff user device 210 from the EPS to another network, to handoff a user device 210 from the other network to the EPS, and/or to perform other operations. MME 240 may perform policing operations for traffic destined for and/or received from user device 210. MME 240 may authenticate user device 210 (e.g., via interaction with HSS/AAA server 260).

PGW 250 may include one or more network devices, such as a gateway, a router, a modem, a switch, a firewall, a NIC, a hub, a bridge, a proxy server, an OADM, or some other type of device that processes and/or transfers traffic. PGW 250 may, for example, provide connectivity of user device 210 to external packet data networks by being a traffic exit/entry point for user device 210. PGW 250 may perform policy enforcement, packet filtering, charging support, lawful intercept, and/or packet screening. PGW 250 may also act as an anchor for mobility between 3GPP and non-3GPP technologies.

HSS/AAA server 260 may include one or more computation or communication devices, such as a server device. In some implementations, HSS/AAA server 260 may include a device that gathers, processes, searches, stores, and/or provides information in a manner described herein. For example, HSS/AAA server 260 may manage, update, and/or store, in a memory associated with HSS/AAA server 260, profile information associated with user device 210 that identifies applications and/or services that are permitted for and/or accessible by user device 210, bandwidth or data rate thresholds associated with the applications or services, information associated with a user of user device 210 (e.g., a username, a password, a personal identification number (PIN), etc.), rate information, minutes allowed, and/or other information. Additionally, or alternatively, HSS/AAA server 260 may include a device that performs authentication, authorization, and/or accounting (AAA) operations associated with a communication connection with user device 210. In some implementations, a home HSS/AAA server 260 may communicate with a roaming MME 240 via an S6A interface or via some other type of interface.

EIR server 270 may include one or more computation or communication devices, such as a server device. In some implementations, EIR server 270 may store a list of identifiers associated with stolen or otherwise unauthorized user devices 210 (e.g., in a data structure of EIR server 270). EIR server 270 may include a user interface (UI) to receive an identifier for a stolen user device 210, such as an international mobile equipment identifier (IMEI), a device identifier, or some other identifier. In some implementations, EIR server 270 may receive the identifier for user device 210 from a client device (e.g., a personal computer, a server, etc.) via a web-based interface. Additionally, or alternatively, EIR server 270 may receive the identifier for user device 210 from an external data structure (e.g., a law-enforcement stolen item registry, a manufacturer's stolen item registry, a merchant's stolen item registry, etc.) Additionally, or alternatively, EIR server 270 may receive an instruction to add the identifier for user device 210 when user device 210 locates to a particular geographic area or exits a particular geographic area. In some implementations, the communication interface between the HSS/AAA server and the EIR server may be based on an S13 interface or some other type of interface.

Network 280 may include one or more wired and/or wireless networks. For example, network 280 may include a cellular network, a public land mobile network (PLMN), a second generation (2G) network, a third generation (3G) network, a fourth generation (4G) network, a fifth generation (5G) network, and/or another network. Additionally, or alternatively, network 280 may include a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
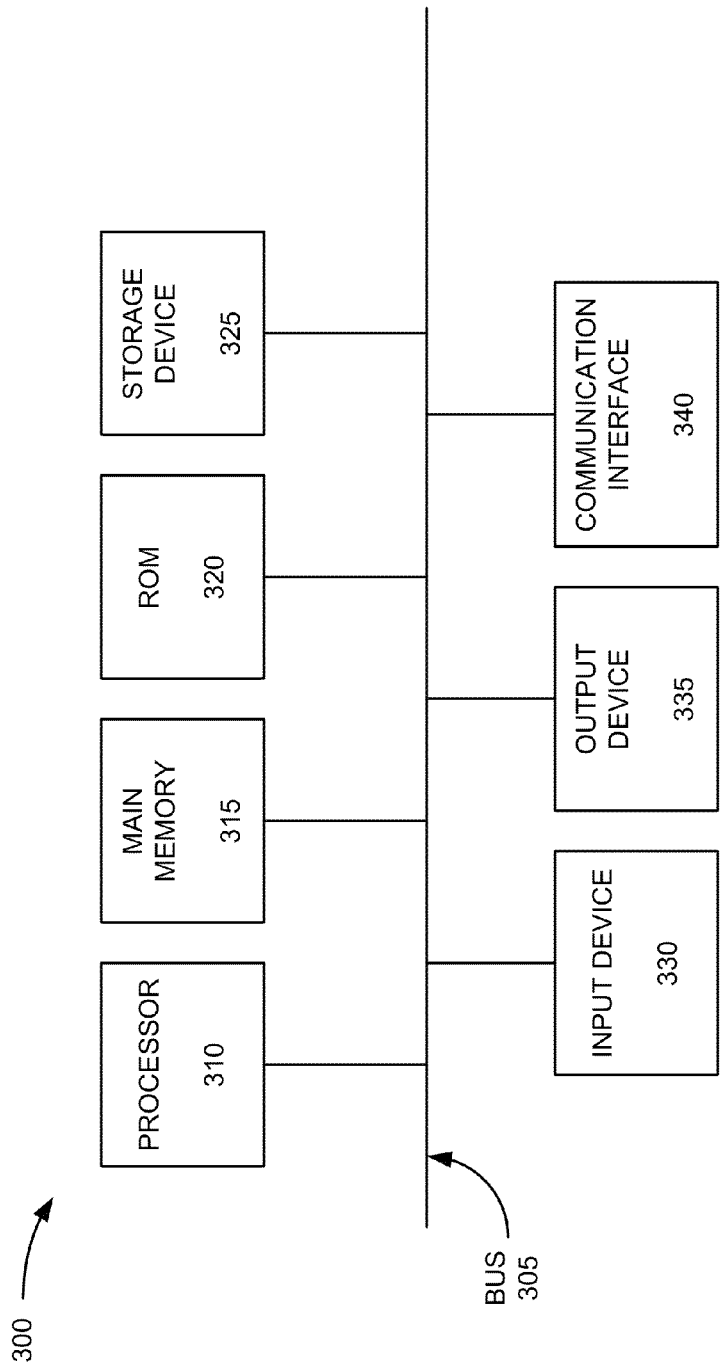
FIG. 3 illustrates example components of a device that may be used within the environment of FIG. 2.

FIG. 3 illustrates example components of a device 300 that may be used within environment 200 of FIG. 2. Device 300 may correspond to user device 210, base station 220, SGW 230, MME 240, PGW 250, HSS/AAA server 260, and/or EIR server 270. Each of user device 210, base station 220, SGW 230, MME 240, PGW 250, HSS/AAA server 260, and/or EIR server 270 may include one or more devices 300, and/or one or more components of device 300.

As shown in FIG. 3, device 300 may include a bus 305, a processor 310, a main memory 315, a read only memory (ROM) 320, a storage device 325, an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
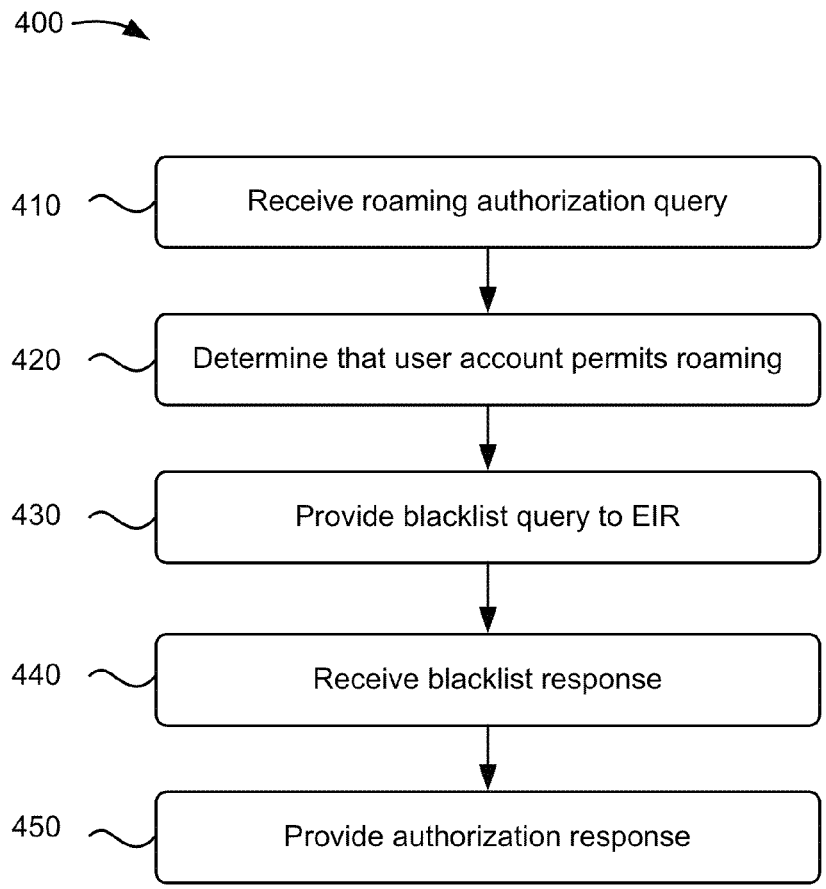
FIG. 4 illustrates a flowchart of an example process for providing a network authorization response.

FIG. 4 illustrates a flowchart of an example process 400 for providing a network authorization response. In one implementation, process 400 may be performed by one or more components of HSS/AAA server 260. In another implementation, some or all of blocks of process 400 may be performed by one or more components of another device in environment 200 (e.g., EIR server 270), or a group of devices including or excluding HSS/AAA server 260.

As shown in FIG. 4, process 400 may include receiving a roaming authorization query (block 410). For example, HSS/AAA server 260 (e.g., a home HSS/AAA server 260) may receive an authorization query from a roaming MME 240. In some implementations, the roaming MME 240 may provide the authorization query to HSS/AAA server 260 when user device 210 attempts to access a roaming network via the roaming MME 240.

In some implementations, the authorization query may include a SIM card identifier, an IMEI, or some other identifier associated with user device 210. Additionally, the authorization query may include a request for information to identify whether user device 210 is authorized to access a roaming network associated with the roaming MME 220.

Process 400 may also include determining that a user account permits roaming (block 420). For example, HSS/AAA server 260 may determine that a user account, associated with user device 210, includes information that permits user device 210 to access a roaming network via roaming MME 240. In some implementations, HSS/AAA server 260 may identify the user account, associated with user device 210, based on information stored by the SIM card of user device 210 and based on user account information stored by HSS/AAA server 260. In some implementations, HSS/AAA server 260 may provide a response, to roaming MME 240, to indicate that user device 210 is not permitted to connect to the roaming network (e.g., when the user account does not permit roaming).

Process 400 may further include providing a blacklist query to the EIR server (block 430). For example, HSS/AAA server 260 may provide a blacklist query to EIR server 270 based on determining that the user account permits roaming. In some implementations, the blacklist query may include the IMEI, or some other identifier associated with user device 210, received by HSS/AAA server 260 from roaming MME 240 as part of the authorization query. In some implementations, EIR server 270 may search for the identifier, associated with user device 210, in a data structure stored by EIR server 270 identifying stolen or otherwise unauthorized devices. EIR server 270 may generate a blacklist response identifying whether the identifier of user device 210 is being stored by EIR server 270.

Process 400 may also include receiving a blacklist response (block 440). For example, HSS/AAA server 260 may receive the blacklist response from EIR server 270 based on providing EIR server 270 with the blacklist query, as described above. In some implementations, the blacklist response may indicate whether the identifier of user device 210 (e.g., the identifier received by the roaming MME 240 as part of the authorization query) is included in a data structure stored by EIR server 270 identifying stolen or otherwise unauthorized devices.

Process 400 may further include providing an authorization response (block 450). For example, HSS/AAA server 260 may provide an authorization response to the roaming MME 240. For example, the authorization response may include an indication that user device 210 is authorized to connect with the roaming MME 240 or an indication that user device 210 is not authorized to connect with the roaming MME 240. As an example, assume that the blacklist response indicates that the identifier of user device 210 is stored by EIR server 270. Given this assumption, the authorization response includes an indication that user device 210 is not authorized to a network associated with roaming MME 240.

While a particular series of blocks has been described above with regard to FIG. 4, the operations the data flows, and/or the order of the blocks may be modified in other implementations. Further, non-dependent operations and/or data flows may be performed in parallel.

Figure 5:
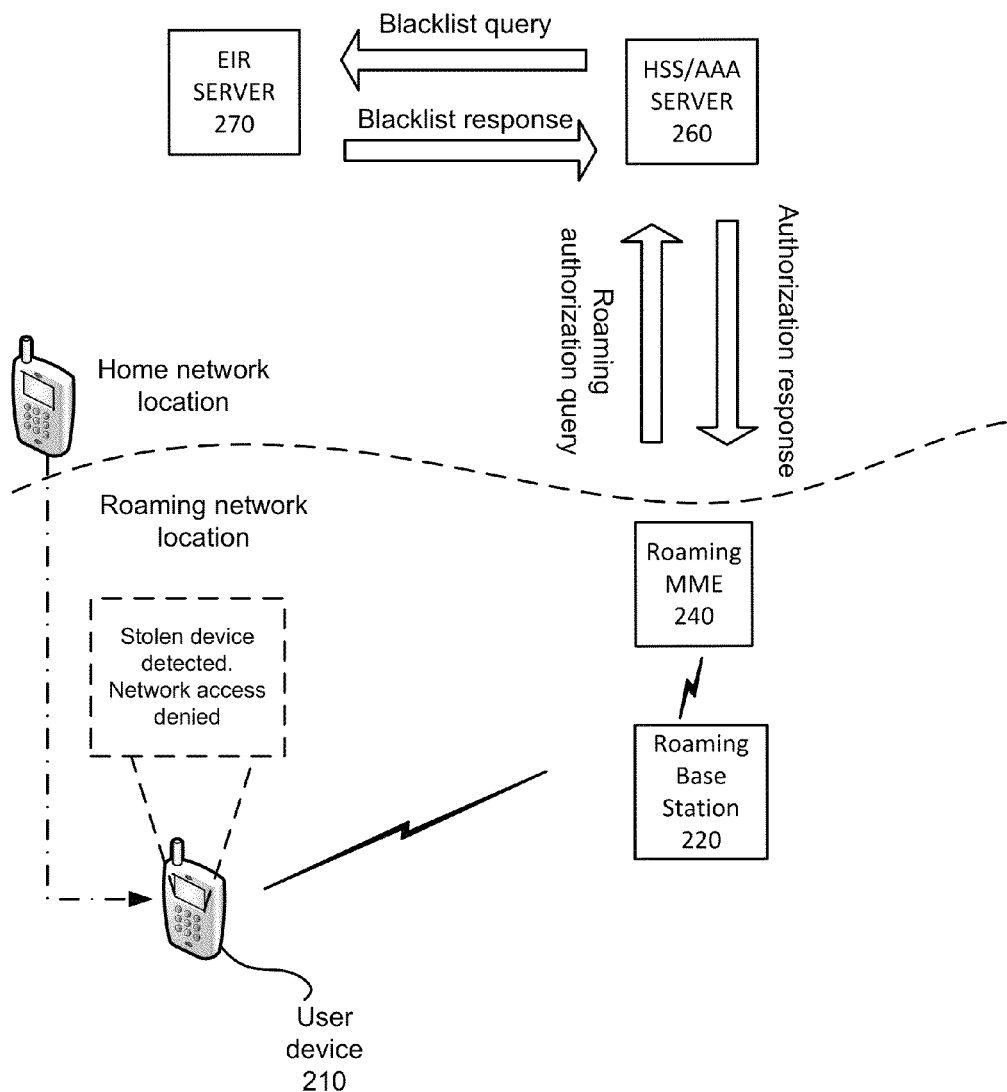
FIG. 5 illustrates an example implementation as described herein.

FIG. 5 illustrates an example implementation as described herein. In FIG. 5, assume that EIR server 270 stores an identifier associated with user device 210. That is, user device 210 is considered to be a stolen user device 210 or is considered to be otherwise an unauthorized user device 210. Further assume that user device 210 relocates from a geographic location associated with a home network to a geographic location associated with a roaming network. Thus, user device 210 may attempt to connect to the roaming network via roaming base station 220 and roaming MME 240. As described above, roaming MME 240 may identify a particular HSS/AAA server 260 associated with user device 210 (e.g., based on information stored by a SIM card of user device 210), and may provide a roaming authorization query to the identified HSS/AAA server 260. The roaming authorization query may include the identifier of the user device and a request for information to identify whether user device 210 is authorized to connect to the roaming network.

As further shown in FIG. 5, HSS/AAA server 260 may receive the roaming authorization query, and may provide a blacklist query to EIR server 270. The blacklist query may include the identifier of user device 210 and a request for information to identify whether the identifier of user device 210 is being stored by EIR server 270 (e.g., in a data structure of EIR server 270). In some implementations, EIR server 270 may search for the identifier of user device 210 and may identify that the identifier of user device 210 is being stored by EIR server 270. As further shown in FIG. 5, EIR server 270 may provide a blacklist response to identify that the identifier of user device 210 is being stored by EIR server 270.

HSS/AAA server 260 may provide an authorization response to roaming MME 240 to indicate that user device 210 is not authorized to connect to the roaming network since the blacklist response indicated that the identifier of user device 210 is being stored by EIR server 270. In some implementations, the authorization response may include an indication that user device 210 is considered to be an unauthorized device and an instruction to direct roaming MME 240 to block access of user device 210 to the roaming network. The instruction may also direct roaming MME 240 to provide user device 210 with an instruction that causes user device 210 to become unresponsive to user input (e.g., disable user device 210).

While a particular example is shown in FIG. 5, it will be apparent that the above description is merely an example implementation. Also, while FIG. 5 shows a particular user interface of user device 210, the user interface shown in FIG. 5 is merely an example and in practice, the user interface may appear differently and may have a different format that what is shown in FIG. 5.

As a result, a stolen user device 210 may not be used to access a network associated with a roaming network device (e.g., roaming base station 220 or roaming MME 240) even if an account associated with a SIM card of user device 210 permits roaming network access. Further, the roaming network device may prevent access to the roaming network without accessing EIR server 270 associated with the home network. Additionally, HSS/AAA server 260 may deactivate functions of user device 210. For example, HSS/AAA server 260 may send an instruction to user device 210 (e.g., via roaming MME 240) that causes user device 210 to deactivate functions relating to requests for data packets via a network associated with the roaming network device.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:
1. A method comprising:
   receiving, by a first server associated with a first network, a first query from a network device associated with a second network,
   the first query including a request for information to identify whether a user device is authorized to access the second network, the first network being associated with a network that services a geographic region associated with the user device, and the first query being transmitted to the first server based on an identifier associated with the user device;

determining, by the first server, the identifier associated with the user device;

providing, by the first server and to a second server, a second query including the identifier, the second query including a request for information to identify whether the identifier of the user device is being stored by the second server;

receiving, by the first server and from the second server, a response to the second query, the response to the second query identifying whether the identifier of the user device is being stored by the second server;

determining, by the first server, that the user device is not authorized to access the second network when the response to the second query identifies that the identifier of the user device is being stored by the second server;

determining, by the first server, that the user device is authorized to access the second network when the response to the second query identifies that the identifier of the user device is not being stored by the second server; and providing, by the first server to the network device, a response to the first query, the response to the first query identifying whether the user device is authorized to access the second network based on determining that the user device is not authorized to access the second network or based on determining that the user device is authorized to access the second network.

2. The method of claim 1, further comprising:
causing the user device to be deactived from operation based on determining that the user device is not authorized to access the second network.

3. The method of claim 1, further comprising:
receiving information regarding a user account of the user device as part of the first query; and
determining that the user account includes information that indicates that the user device is authorized to access the second network,
where providing the second query is based on determining that the user account includes the information that indicates that the user device is authorized to access the second network.

4. The method of claim 1, where the first server provides the second query to the second server via an S13 interface between the first server and the second server.

5. The method of claim 1, where the first server communicates with the network device via an S6A interface to receive the first query from the network device.

6. The method of claim 1, where
the first network is associated with a home network of the user device,
the second network is associated with a roaming network of the user device, and
the first network is different from the second network.

7. A system comprising:
one or more servers, including a memory and a processor and associated with a first network, to:
receive one or more identifiers associated with respective user devices of the first network;
store the one or more identifiers;
receive a query from a network device associated with a second network,
the query including a request for information to identify whether a user device is authorized to access the second network,
the first network being associated with a network that services a geographic region associated with the user device, and
the query being transmitted based on an identifier associated with the user device;
determine the identifier associated with the user device;
determine whether the identifier matches one of the stored one or more identifiers;
determine that the user device is not authorized to access the second network based on determining that the identifier matches one of the stored one or more identifiers;
determine that the user device is authorized to access the second network based on determining that the identifier does not match one of the stored one or more identifiers; and
provide, to the network device, a response to the query,
the response to query identifying whether the user device is authorized to access the second network based on determining that the user device is not authorized to access the second network or based on determining that the user device is authorized to access the second network.

8. The system of claim 7, where the one or more servers are further to:
cause the user device to be deactivated from operation based on determining that the user device is not authorized to access the second network.

9. The system of claim 7, where the one or more servers are further to:
receive information regarding a user account of the user device as part of the query; and
determine that the user account includes information that indicates that the user device is authorized to access the second network,
where, when determining that the user device is authorized to access the second network, the one or more servers are further to:
determine that the user device is authorized to access the second network based on determining that the user account includes the information that indicates that the user device is authorized to access the second network.

10. The system of claim 7, where the one or more servers include a first server and a second server that communicate with each other using an S13 interface.

11. The system of claim 7, where the one or more servers communicate with the network device via an S6A interface to receive the query from the network device.

12. The system of claim 7, where the first network is associated with a home network of the user device, the second network is associated with a roaming network of the user device, and the first network is different from the second network.

13. The system of claim 7, where the one or more servers are further to:
receive the one or more identifiers from a stolen equipment registry,
where, when storing the one or more identifiers, the one or more servers are further to:

store the one or more identifiers based on receiving the one or more identifiers from the stolen equipment registry.

14. The system of claim 7, where the one or more servers are further to:
receive a particular one of the one or more identifiers from a client device via a web-based interface,
where, when storing the one or more identifiers, the one or more servers are further to:
store the one or more identifiers based on receiving the particular one of the one or more identifiers from the client device.

15. The system of claim 7, where the one or more servers are further to:
receive a particular one of the one or more identifiers from the user device when user device enters or exits a particular geographic region,
where, when storing the one or more identifiers, the one or more servers are further to:
store the one or more identifiers based on receiving the particular one of the one or more identifiers from the user device.

16. A non-transitory computer-readable medium storing instructions, the instructions comprising:
a plurality of instructions which, when executed by one or more processors associated with a first server of a first network, cause the one or more processors to:
receive a first query from a network device associated with a second network,
the first query including a request for information to identify whether a user device is authorized to access the second network,
the first network being associated with a network that services a geographic region associated with the user device, and
the first query being transmitted to the first server based on an identifier associated with the user device;
determine the identifier associated with the user device;
provide, to a second server, a second query including the identifier,
the second query including a request for information to identify whether the identifier of the user device is being stored by the second server;
receive, from the second server, a response to the second query,
the response to the second query identifying that the identifier of the user device is being stored by the second server;
determine, based on the response, that the user device is not authorized to access the second network;
provide, to the network device, a response to the first query,
the response to the first query identifying that the user device is not authorized to access the second network, and
the network device denying the user device access to the second network based on the response.

17. The computer-readable medium of claim 16, where the plurality of instructions further include:
one or more instructions to receive information regarding a user account, of the user device, as part of the first query; and
one or more instructions to determine that the user account includes information that indicates that the user device is authorized to access the second network,
where one or more instructions to provide the second query to the second server include:
one or more instructions to provide the second query to the second server based on determining that the user account includes information that indicates that the user device is authorized to access the second network.

18. The computer-readable medium of claim 16, where the first network is associated with a home network of the user device, the second network is associated with a roaming network of the user device, and the first network is different from the second network.

19. The computer-readable medium of claim 16, where the plurality of instructions further include:
one or more instructions to cause the user device to be deactivated from operation based on determining that the user device is not authorized to access the second network.

20. The computer-readable medium of claim 16, where
the second server receives one or more identifiers from a stolen equipment registry or receives a particular one of the one or more identifiers from a client device via a web-based interface, and
the second server provides the response to the second query based on determining whether the identifier matches one of:
the one or more identifiers from the stolen equipment registry, or
the particular one of the one or more identifiers from the client device.

* * * * *